US010103400B2

(12) United States Patent
Mori et al.

(10) Patent No.: US 10,103,400 B2
(45) Date of Patent: Oct. 16, 2018

(54) MEMBRANE-ELECTRODE ASSEMBLY, MANUFACTURE METHOD THEREOF, AND SOLID POLYMER FUEL CELL

(71) Applicant: Panasonic Intellectual Property Management Co., Ltd., Osaka (JP)

(72) Inventors: Masahiro Mori, Osaka (JP); Toshiyuki Kojima, Kyoto (JP); Shinya Kikuzumi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 80 days.

(21) Appl. No.: 15/351,702

(22) Filed: Nov. 15, 2016

(65) Prior Publication Data

US 2017/0062854 A1 Mar. 2, 2017

Related U.S. Application Data

(63) Continuation of application No. 14/422,230, filed as application No. PCT/JP2014/002791 on May 27, 2014, now Pat. No. 9,531,025.

(30) Foreign Application Priority Data

Jun. 4, 2013 (JP) ................................ 2013-117967

(51) Int. Cl.
*H01M 8/1004* (2016.01)
*H01M 8/1039* (2016.01)
(Continued)

(52) U.S. Cl.
CPC ....... *H01M 8/1004* (2013.01); *H01M 4/8657* (2013.01); *H01M 4/881* (2013.01);
(Continued)

(58) Field of Classification Search
CPC . H01M 2008/1095; H01M 2300/0094; H01M 4/8657; H01M 4/881; H01M 4/92;
(Continued)

(56) References Cited

U.S. PATENT DOCUMENTS 6,713,207 B2 3/2004 Tsusaka et al.
7,749,640 B2 7/2010 Kan et al.
(Continued)

FOREIGN PATENT DOCUMENTS

JP 2001-325963 11/2001
JP 2004-071324 3/2004
(Continued)

OTHER PUBLICATIONS

International Search Report dated Aug. 5, 2014 in International (PCT) Application No. PCT/JP2014/002791.
(Continued)

*Primary Examiner* — Carlos Barcena
(74) *Attorney, Agent, or Firm* — Wenderoth, Lind & Ponack, L.L.P.

(57) ABSTRACT

A membrane-electrode assembly including an electrolyte membrane (1), a pair of catalyst layers (3, 3) facing each other sandwiching the electrolyte membrane (1), and a pair of gas diffusion layers facing each other sandwiching the electrolyte membrane (1) and the pair of catalyst layers (3, 3), wherein at least one of the pair of catalyst layers (3, 3) includes unwoven cloth (6A) including fiber-like structures (6) each having proton conduction performance, and wherein a portion of the unwoven cloth is buried in the electrolyte membrane (1) adjacent to the catalyst layer (3) including the unwoven cloth (6A).

11 Claims, 9 Drawing Sheets

(51) Int. Cl.

| | |
|---|---|
| ***H01M 8/1053*** | (2016.01) |
| ***H01M 4/88*** | (2006.01) |
| ***H01M 8/1044*** | (2016.01) |
| ***H01M 8/1081*** | (2016.01) |
| ***H01M 8/1086*** | (2016.01) |
| ***H01M 4/86*** | (2006.01) |
| *H01M 4/92* | (2006.01) |
| *H01M 8/1018* | (2016.01) |

(52) U.S. Cl.

CPC ....... *H01M 8/1039* (2013.01); *H01M 8/1044* (2013.01); *H01M 8/1053* (2013.01); *H01M 8/1081* (2013.01); *H01M 8/1086* (2013.01); *H01M 4/92* (2013.01); *H01M 2008/1095* (2013.01); *H01M 2300/0094* (2013.01); *Y02E 60/521* (2013.01); *Y02P 70/56* (2015.11)

(58) Field of Classification Search

CPC ............. H01M 8/1004; H01M 8/1039; H01M 8/1044; H01M 8/1053; H01M 8/1081; H01M 8/1086

See application file for complete search history.

(56) References Cited

U.S. PATENT DOCUMENTS

| | | | | |
|---|---|---|---|---|
| 8,383,539 | B2 | 2/2013 | Sumida et al. | |
| 2002/0001744 | A1 | 1/2002 | Tsusaka et al. | |
| 2004/0209155 | A1 | 10/2004 | Kosako et al. | |
| 2006/0003212 | A1 | 1/2006 | Kim et al. | |
| 2006/0068270 | A1 * | 3/2006 | Ino | H01M 4/8605 429/450 |
| 2006/0159973 | A1 | 7/2006 | Kotera et al. | |
| 2007/0287058 | A1 | 12/2007 | Kan et al. | |
| 2009/0155658 | A1 | 6/2009 | Kotera et al. | |
| 2009/0280378 | A1 | 11/2009 | Matsumoto | |
| 2011/0014542 | A1 | 1/2011 | Sumida et al. | |
| 2014/0242477 | A1 | 8/2014 | Kikuzumi et al. | |

FOREIGN PATENT DOCUMENTS

| | | |
|---|---|---|
| JP | 2004-273257 | 9/2004 |
| JP | 2006-019298 | 1/2006 |
| JP | 2006-216402 | 8/2006 |
| JP | 2008-108723 | 5/2008 |
| JP | 2008-276990 | 11/2008 |
| JP | 2010-049845 | 3/2010 |
| JP | 2012-064343 | 3/2012 |
| WO | 2006/085617 | 8/2006 |
| WO | 2009/075357 | 6/2009 |
| WO | 2012/058425 | 5/2012 |
| WO | 2013/051189 | 4/2013 |

OTHER PUBLICATIONS

International Preliminary Report on Patentability and Written Opinion of the International Searching Authority dated Dec. 17, 2015 in International (PCT) Application No. PCT/JP2014/002791 with English translation.

Extended European Search Report dated Jan. 14, 2016 in corresponding European Patent Application No. 14807069.1.

* cited by examiner

Fig. 6B
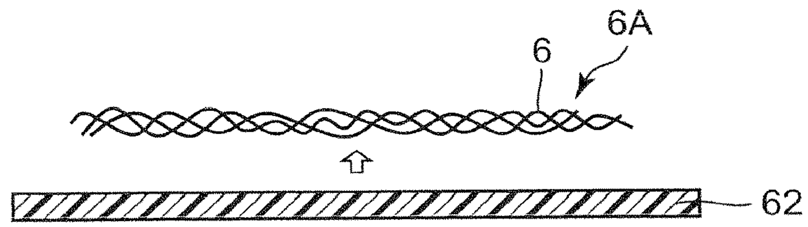
Fig. 6C
1
62
Fig. 6D
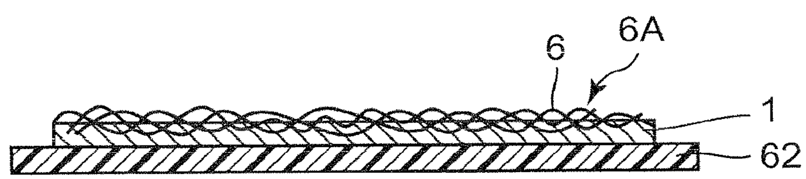
Fig. 6E
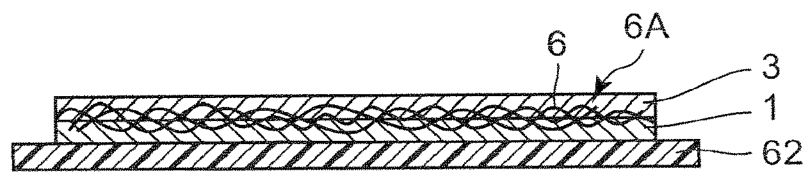
Fig. 7A
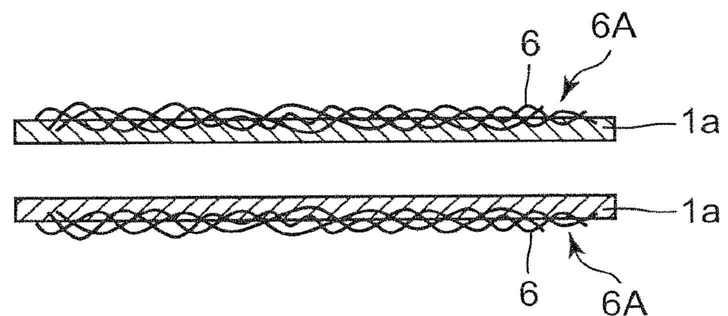

MEMBRANE-ELECTRODE ASSEMBLY, MANUFACTURE METHOD THEREOF, AND SOLID POLYMER FUEL CELL

TECHNICAL FIELD

The invention relates to a solid polymer fuel cell (hereinafter, referred to as "fuel cell") and, more particularly, to a membrane-electrode assembly included in the fuel cell and a manufacture method of the membrane-electrode assembly.

BACKGROUND ART

A fuel cell is an apparatus that simultaneously generates electric power and heat by electrochemically reacting a fuel gas including hydrogen and an oxidizer gas including oxygen such as air with each other.

The fuel cell is generally configured by stacking plural cells (single cells) on each other and press-fastening the stacked plural cells with a fastening member such as a bolt. Each one of the cells is configured by sandwiching a membrane-electrode assembly using a pair of plate-like electrically conductive separators therebetween. The outer circumferential area of the membrane-electrode assembly is held by a frame to improve its handling performance. The membrane-electrode assembly including the frame will herein be referred to as "electrode-membrane-frame assembly".

The membrane-electrode assembly includes an electrolyte membrane and a pair of electrode layers formed on both surfaces of the electrolyte membrane. One of the pair of electrode layers is an anode electrode and the other thereof is a cathode electrode. Each of the electrode layers includes a catalyst layer formed on the surface of the electrolyte membrane, and a gas diffusion layer formed on the catalyst layer.

In the fuel cell having the above configuration, a fuel gas is supplied to the anode electrode and, thereby, the fuel gas is converted into protons by the catalyst layer. The protons pass through the electrolyte membrane and reach the catalyst layer of the cathode electrode to bond with the oxidizer gas supplied to the cathode electrode. Thereby, an electric power generation reaction occurs.

The catalyst layer generally includes a catalyst, a catalyst carrier, and an electrolyte. The catalyst produces protons from the fuel gas and causes the protons and the oxidizer gas to bond with each other. The catalyst carrier extracts the electricity generated by the electric power generation reaction from the catalyst to an external circuit. The electrolyte propagates the protons produced from the fuel gas.

The electric power generation performance of the fuel cell is influenced by the reaction efficiency of the catalyst layer, the diffusivity of the gas in each of the gas diffusion layer and the catalyst layer, the resistive loss of the electricity generated by the electric power generation reaction, the proton conductivity, etc. To improve the electric power generation performance of the fuel cell, it is required that such paths are excellently formed as the propagation path for each of the fuel gas and the oxidizer gas, the electricity conduction path for the electricity extracted by the catalyst, and the proton conduction path for the protons produced from the fuel gas.

The protons need to be propagated not only into the inside of the catalyst but also from the catalyst to the electrolyte membrane. Therefore, the proton conduction path needs to be formed for the protons to excellently be propagated also in the vicinity of the interface between the catalyst and the electrolyte membrane.

A method of forming the proton conduction path in the vicinity of the interface between the catalyst layer and the electrolyte layer can be, for example, a method disclosed in Patent Document 1 (Japanese Unexamined Patent Publication No. 2001-325963). FIG. 9 is a schematic explanatory diagram of a manufacture method of a membrane-electrode assembly disclosed in Patent Document 1.

As depicted in FIG. 9 (in its left-hand portion), an electrolyte membrane 101 and a pair of electrode layers 102 are prepared. The electrolyte membrane 101 has a siloxane monomer component 105*a* mixed therein. The electrode layers 102 each include a catalyst layer 103 and a gas diffusion layer 104. The catalyst layer 103 has a siloxane monomer component 105*b* mixed therein.

As depicted in FIG. 9 (in its right-hand portion), the pair of electrode layers 102, 102 are disposed such that the catalyst layers 103, 103 are on and in contact with the electrolyte membrane 101 and, thereafter, heat and a pressure are applied to the electrolyte membrane 101 and the catalyst layers 103 to bond these to each other. At this time, the siloxane monomer component 105*a* and the siloxane monomer component 105*b* condensation-polymerize with each other and, thereby, siloxane polymers 106*a* and 106*b* are formed straddling over the catalyst layers 103 and the electrolyte membrane 101. These siloxane polymers 106*a*, 106*b* act as the proton conduction path in the vicinity of the interface between the catalyst layers 103 and the electrolyte membrane 101.

A configuration to form the proton conduction path in the vicinity of the interface between the catalyst layer and the electrolyte membrane can be, for example, a configuration disclosed in Patent Document 2 (Japanese Unexamined Patent Publication No. 2012-64343). FIG. 10 is a schematic explanatory diagram of an outlined configuration of a membrane-electrode assembly disclosed in Patent Document 2. Patent Document 2 discloses the configuration having a porous support 203 disposed therein that penetrates an electrolyte membrane 201 and at least a portion of each of catalyst layers 202.

PATENT DOCUMENTS

Patent Document 1: Japanese Unexamined Patent Publication No. 2001-325963

Patent Document 2: Japanese Unexamined Patent Publication No. 2012-64343

SUMMARY OF THE INVENTION

Problems to be Solved by the Invention

However, the configuration described in Patent Document 1 has room for improvement from the viewpoint of improving the electric power generation performance.

With the configuration described in Patent Document 1, the condensation-polymerization reaction occurs only in the portion in which the siloxane monomer component 105*a* mixed in the electrolyte membrane 101 and the siloxane monomer component 105*b* mixed in each of the catalyst layers 103 are in contact with each other, and the siloxane polymers 106*a* and 106*b* are formed straddling over the catalyst layers 103 and the electrolyte membrane 101. In other words, no condensation-polymerization reaction occurs in the portion in which the siloxane monomer component 105_a_ and siloxane monomer component 105_b_ are not in contact with each other, and therefore, the siloxane polymers 106_a_ and 106_b_ are not formed to be the proton conduction path.

With the configuration described in Patent Document 1, it is difficult to control the contact area between the siloxane monomer component 105_a_ and the siloxane monomer component 105_b_ to an intended area.

With the configuration described in Patent Document 2, since the porous support 203 penetrates the electrolyte membrane 201, and therefore, cross leaking tends to occur along the interface between the porous support 203 and the electrolyte membrane 201. In this case, the electric power generation performance is degraded.

An object of the invention is to solve the problems and is to provide a membrane-electrode assembly capable of further improving the electric power generation performance, a manufacture method thereof, and a solid polymer fuel cell including the membrane-electrode assembly.

Means to Solve the Problems

To achieve the objects, the membrane-electrode assembly according to the invention includes:

an electrolyte membrane;

a pair of catalyst layers facing each other sandwiching the electrolyte membrane therebetween; and a pair of gas diffusion layers facing each other sandwiching the electrolyte membrane and the pair of catalyst layers therebetween, wherein at least one of the pair of catalyst layers includes unwoven cloth including fiber-like structures having proton conduction performance, and a portion of the unwoven cloth is configured to be buried in the electrolyte membrane adjacent to the catalyst layer including the unwoven cloth.

Effect of the Invention

According to the membrane-electrode assembly of the invention, the electric power generation performance can further be improved.

BRIEF DESCRIPTION OF THE DRAWINGS

The above and other objects and features of the invention will be apparent from the following description concerning a preferred embodiment with respect to the accompanying drawings, in which:

FIG. 6B is an explanatory diagram of a process step succeeding that of FIG. 6A;

FIG. 60 is an explanatory diagram of a process step succeeding that of FIG. 6B;

FIG. 6D is an explanatory diagram of a process step succeeding that of FIG. 60;

FIG. 6E is an explanatory diagram of a process step succeeding that of FIG. 6D;

FIG. 7A is a schematic explanatory diagram of an example of a manufacture method of a membrane-electrode assembly having a proton conductive fiber formed in the vicinity of the interfaces between both surfaces of the electrolyte membrane and the catalyst layers;

MODE FOR CARRYING OUT THE INVENTION

Figure 1:
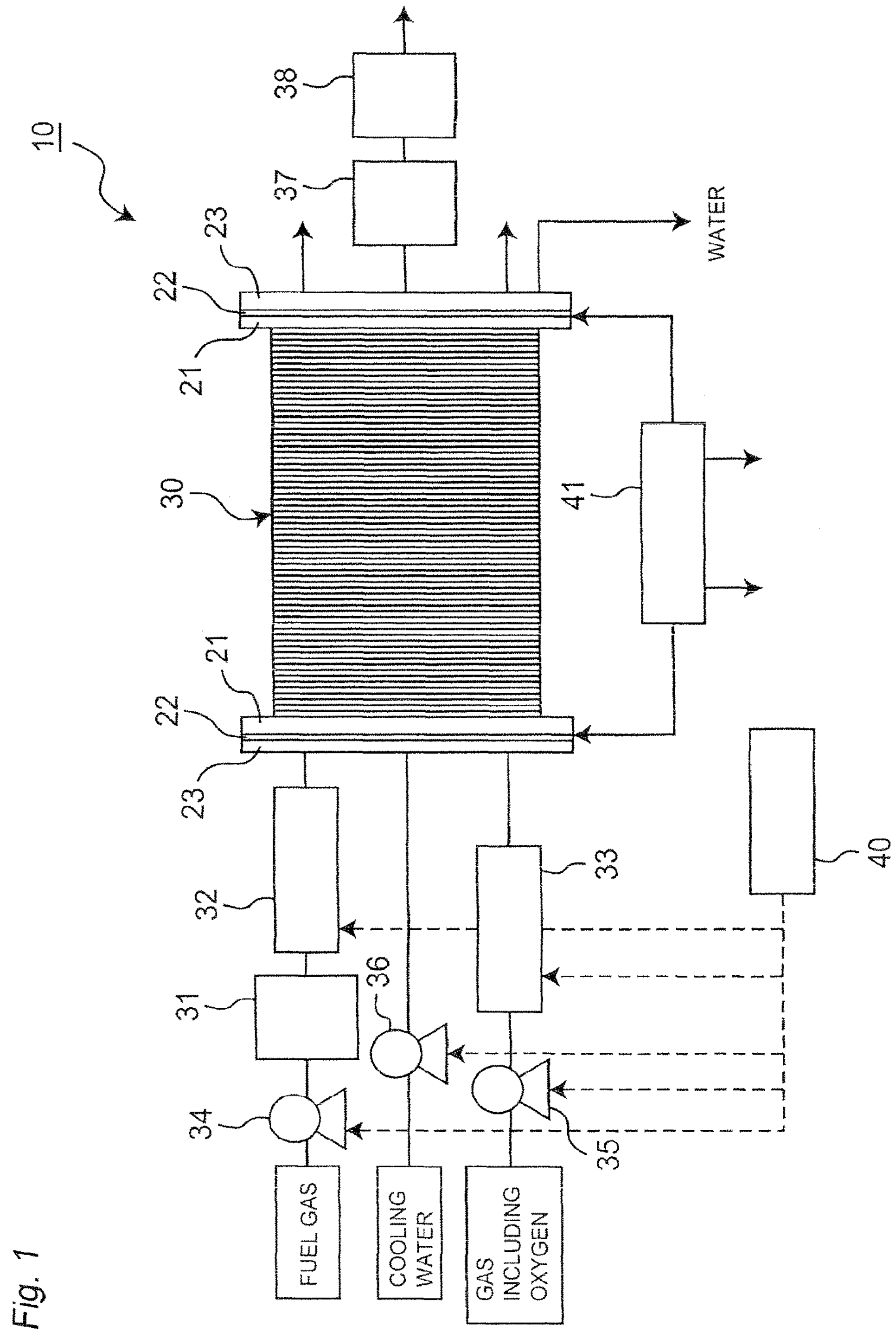
FIG. 1 is a schematic configuration diagram of an outlined configuration of a fuel cell according to an embodiment of the invention.

According to a first aspect of the invention, a membrane-electrode assembly is provided that includes:

an electrolyte membrane;

a pair of catalyst layers facing each other sandwiching the electrolyte membrane; and a pair of gas diffusion layers facing each other sandwiching the electrolyte membrane and the pair of catalyst layers, wherein at least one of the pair of catalyst layers includes unwoven cloth including fiber-like structures each having proton conduction performance, and a portion of the unwoven cloth is buried in the electrolyte membrane adjacent to the catalyst layer including the unwoven cloth.

According to a second aspect of the invention, the membrane-electrode assembly according to the first aspect is provided, wherein the unwoven cloth is buried in the electrolyte membrane at a depth two or more times as large as the diameter of the structure.

According to a third aspect of the invention, the membrane-electrode assembly according to the first or the second aspect is provided, wherein a region including the unwoven cloth is in a range from 10% or higher to 90% or lower of the thickness of the catalyst layer from the interface between the electrolyte membrane and the catalyst layer.

According to a fourth aspect of the invention, the membrane-electrode assembly according to any one of the first to the third aspects is provided, wherein the structure includes a mixture of a perfluorosulphonic acid-based polymer and a fluorocarbon-based polymer.

According to a fifth aspect of the invention, the membrane-electrode assembly according to any one of the first to the fourth aspects is provided, wherein the structure includes plural fluorocarbon-based polymer fibers, and one perfluorosulphonic acid-based polymer having therein the plural fluorocarbon-based polymer fibers.

According to a sixth aspect of the invention, the membrane-electrode assembly according to the fourth or the fifth aspect is provided, wherein the weight of the perfluorosulphonic acid-based polymer is 0.25 or greater times and four or smaller times as heavy as the weight of the fluorocarbon-based polymer.

According to a seventh aspect of the invention, the membrane-electrode assembly according to any one of the fourth to the sixth aspects is provided, wherein the electrolyte membrane includes a perfluorosulphonic acid-based polymer that is a same type of material as the perfluorosulphonic acid-based polymer included in the structure.

According to an eighth aspect of the invention, the membrane-electrode assembly according to any one of the fourth to the seventh aspects is provided, wherein the catalyst layer includes a perfluorosulphonic acid-based polymer that is a same type of material as the perfluorosulphonic acid-based polymer included in the structure.

According to a ninth aspect of the invention, the membrane-electrode assembly according to any one of the first to the eighth aspects is provided, wherein the structure has one or more air gap(s) present therein.

According to a tenth aspect of the invention, the membrane-electrode assembly according to any one of the first to the ninth aspects is provided, wherein the unwoven cloth is included in each of both of the pair of catalyst layers, and the unwoven cloth included in one of the pair of catalyst layers and the unwoven cloth included in the other of the pair of catalyst layers are disposed away from each other.

According to an eleventh aspect of the invention, the membrane-electrode assembly according to any one of the first to the ninth aspects is provided, wherein the unwoven cloth is disposed only on a cathode electrode side.

According to a twelfth aspect of the invention, a solid polymer fuel cell is provided that includes the membrane-electrode assembly according to any one of the first to the eleventh aspects.

According to a thirteenth aspect of the invention, a manufacture method of the membrane-electrode assembly of the first aspect is provided, that includes:

forming the unwoven cloth on a surface of an undried electrolyte solution that includes materials of the electrolyte membrane;

forming the electrolyte membrane having a portion of the unwoven cloth buried therein, by drying the electrolyte solution; and forming the catalyst layer to cover a other portion of the unwoven cloth.

According to a fourteenth aspect according to the invention, the manufacture method of the membrane-electrode assembly of the thirteenth aspect is provided, wherein the unwoven cloth is formed using an electro-spinning method.

Before continuing to describe the invention, the same parts will be given the same reference numerals in the accompanying drawings.

An embodiment of the invention will be described with reference to the drawings.

(Embodiment)

Figure 2:
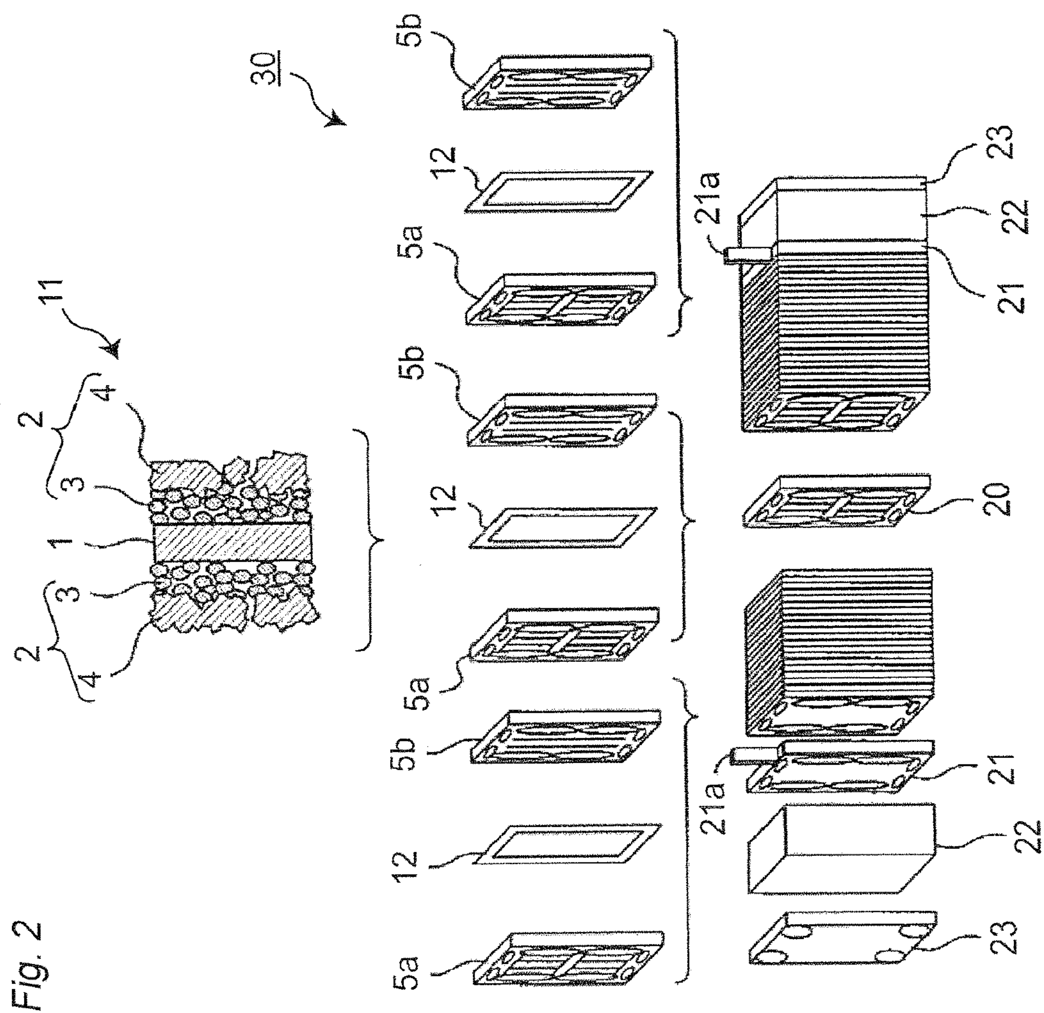
FIG. 2 is a schematic exploded diagram of a fuel cell stack included in the fuel cell depicted in FIG. 1.

An outlined configuration will be described of a fuel cell including a fuel cell stack according to the embodiment of the invention. FIG. 1 is a schematic configuration diagram of the outlined configuration of the fuel cell. FIG. 2 is a schematic exploded diagram of the fuel cell stack (hereinafter, referred to as "stack") included in the fuel cell depicted in FIG. 1.

A fuel cell 10 is a solid polymer fuel cell and simultaneously generates electric power, heat, and water by electrochemically reacting a fuel gas including hydrogen and an oxidizer gas including oxygen such as air, with each other.

As depicted in FIG. 1, the fuel cell 10 includes the stack 30 having a stack structure including plural fuel cell cells (or single cells) connected in series therein each including a pair of electrodes of an anode and a cathode, a fuel treating device 31 extracting hydrogen from the fuel gas, an anode humidifier 32 improving the electric power generation efficiency by humidifying the fuel gas that includes the hydrogen extracted by the fuel treating device 31, a cathode humidifier 33 humidifying a gas including oxygen (an oxidizer gas), and pumps 34 and 35 to respectively supply the fuel gas and the gas including oxygen. That is, a fuel supplying apparatus supplying the fuel gas to each of the cells of the stack 30 is configured by the fuel treating device 31, the anode humidifier 32, and the pump 35. An oxidizer supplying apparatus supplying the oxidizer gas to each of the cells of the stack 30 is configured by the cathode humidifier 33 and the pump 35. Other various types of fuel supplying apparatus and such types of oxidizer supplying apparatus may be employed only when the apparatuses each have the function of supplying the fuel or the oxidizer.

The fuel cell 10 includes a pump 36 to circulate and supply cooling water to efficiently remove the heat generated by the stack 30 during the electric power generation, a heat exchanger 37 to heat-exchange the heat removed by the cooling water (for example, a liquid having no electrical conductivity such as, for example, pure water is used) to a fluid such as tap water, and a hot-water storage tank 38 storing the heat-exchanged tap water. Further, the fuel cell 10 includes an operation control device 40 controlling the operation to generate the electric power correlating these components with each other, and an electric power output unit 41 extracting the electricity generated by the stack 30.

As depicted in FIG. 2, the stack 30 included in the fuel cell 10 is configured by stacking plural single cells (single cell modules) 20 on each other that each are a basic unit configuration and fastening the single cells 20 from both of their sides with a predetermined load using collector plates 21, insulating plates 22, and end plates 23. The collector plates 21 each have an electric current extraction terminal unit 21*a* disposed thereon, and an electric current, that is, the electricity is extracted from this unit during the electric power generation. The insulating plate 22 each may have a feed inlet and/or a drain outlet not depicted for the gases and the cooling water disposed therein. The end plates 23 fasten and hold the plural stacked single cells 20, the collector plates 21, and the insulating plates 22 with the predetermined load using a pressuring means not depicted.

As depicted in FIG. 2, the single cell 20 is configured by sandwiching using a pair of separators 5*a*, 5*b* therebetween an electrode-membrane-frame assembly 12 formed by holding a membrane-electrode assembly 11 by a frame (not depicted).

The membrane-electrode assembly 11 includes an electrolyte membrane 1 and a pair of electrode layers 2, 2 formed on both surfaces of the electrolyte membrane 1. The electrode layers 2 each include a catalyst layer 3 formed on each of both surfaces of the electrolyte membrane 1, and a gas diffusion layer 4 formed on the catalyst layer 3.

The electrolyte membrane 1 includes a proton-conductive ion exchange membrane. Preferably, a cation exchange membrane forming a perfluorocarbon polymer including a sulphonate group is used as the proton-conductive ion exchange membrane because its basic properties are excellent.

The catalyst layer 3 includes a catalyst, a catalyst carrier, and an electrolyte. The catalyst produces protons from the fuel gas and bonds the protons and the oxidizer gas with each other. For example, a platinum alloy including platinum as its main component is usable as the catalyst. The catalyst carrier has electric conductivity and extracts the electricity generated by the electric power generation reaction from the catalyst to an external circuit. For example, a carbon carrier is usable as the catalyst carrier. The electrolyte propagates the protons generated from the fuel gas. For example, "Aquivion (a registered trademark)" manufactured by Solvay Solexis Inc., is usable as the electrolyte. The catalyst layer 3 is set to have a porous structure because the catalyst dispersed in the catalyst layer 3 causes the fuel gas and the oxidizer gas to react with each other.

A base material formed by a carbon fiber is generally used as the base material of the gas diffusion layer 4. For example, carbon fiber woven cloth is usable as the base material.

The separators 5*a*, 5*b* only have to be formed by a gas-impermeable electrically conductive material and, for example, separators each formed by cutting a resin impregrated carbon material into a predetermined shape or separators each formed by molding a mixture of carbon powder and a resin material are generally used. A recessed groove portion is formed in a portion in contact with the membrane-electrode assembly 11 in each of the separators 5*a*, 5*b*. The groove portion of the separator 5*a* is brought into contact with the gas diffusion layer 4 and, thereby, a fuel gas flowing path is formed to supply the fuel gas to the electrode face of the anode electrode and carry away the excessive gas. The groove portion of the separator 5*b* is brought into contact with the gas diffusion layer 4 and, thereby, an oxidizer gas flowing path is formed to supply the oxidizer gas to the electrode face of the cathode electrode and carry away the excessive gas.

Figure 3:
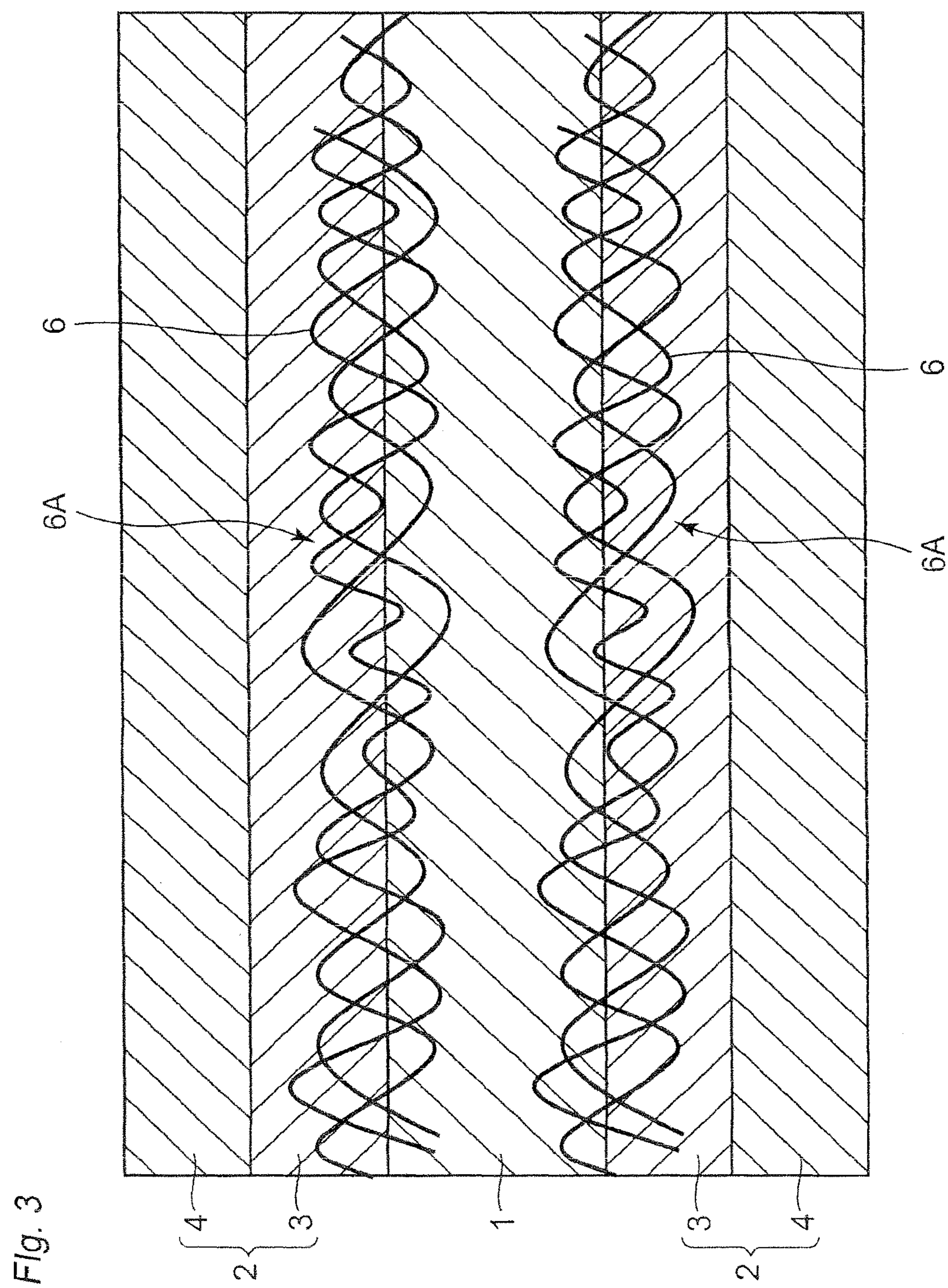
FIG. 3 is a schematic cross-sectional diagram of the structure of a membrane-electrode assembly included in the fuel cell depicted in FIG. 1.

The structure of the membrane-electrode assembly 11 will be described in more detail. FIG. 3 is a schematic cross-sectional diagram of the structure of the membrane-electrode assembly 11.

As depicted in FIG. 3, the membrane-electrode assembly 11 includes unwoven cloth 6A forming fiber-like structures 6 having proton conduction performance (hereinafter, referred to as "proton conductive fibers"). A portion of the unwoven cloth 6A is buried in the electrolyte membrane 1 adjacent to the catalyst layer 3 including the unwoven cloth 6A. The other portion of the unwoven cloth 6A exposed from the electrolyte membrane 1 is positioned inside the catalyst layer 3. In the catalyst layer 3, each of spaces among the fibers of the proton conductive fibers 6 is filled with the catalyst.

The unwoven cloth 6A is included in both of the pair of catalyst layers 3, 3. The unwoven cloth 6A included in the one of the pair of catalyst layers 3, 3, and the unwoven cloth 6A included in the other of the pair of catalyst layers 3, 3 are disposed away from each other. The unwoven cloth 6A is disposed not penetrating the electrolyte membrane 1.

The thickness of each of the electrolyte membrane 1 and the catalyst layer 3 is, for example, 30 μm. The region including the unwoven cloth 6A in the catalyst layer 3 is, for example, in a range of 50% of the thickness of the catalyst layer 3 from the interface between the electrolyte membrane 1 and the catalyst layer 3 (that is, a range of 15 μm from the interface).

According to the membrane-electrode assembly 11 of this embodiment, on the anode electrode side, the protons produced by the catalyst in the catalyst layer 3 can be propagated to the electrolyte membrane 1 through the proton conductive fibers 6. Thereby, the resistance can be reduced that is generated in the interface between the catalyst layer 3 and the electrolyte membrane 1 on the anode electrode side, and the electric power generation performance of the fuel cell can further be improved.

According to the membrane-electrode assembly 11 of this embodiment, the protons propagated to the electrolyte membrane 1 can be propagated to the catalyst layer 3 on the cathode electrode side through the proton conductive fibers 6. Thereby, the resistance can be reduced that is generated in the interface between the catalyst layer 3 and the electrolyte membrane 1 on the cathode electrode side, and the electric power generation performance of the fuel cell can further be improved.

According to the membrane-electrode assembly 11 of this embodiment, the unwoven cloth 6A including the proton conductive fibers 6 formed straddling over the electrolyte membrane 1 and the catalyst layers 3 functions as an anchor and, thereby, peeling off of the catalyst layers 3 from the electrolyte membrane 1 can be prevented.

According to the membrane-electrode assembly 11 of this embodiment, the unwoven cloth 6A is disposed not penetrating the electrolyte membrane 1 and, thereby, occurrence of any cross leaking attributed to the unwoven cloth 6A can be suppressed and any degradation of the electric power generation performance can be suppressed.

Figure 8:
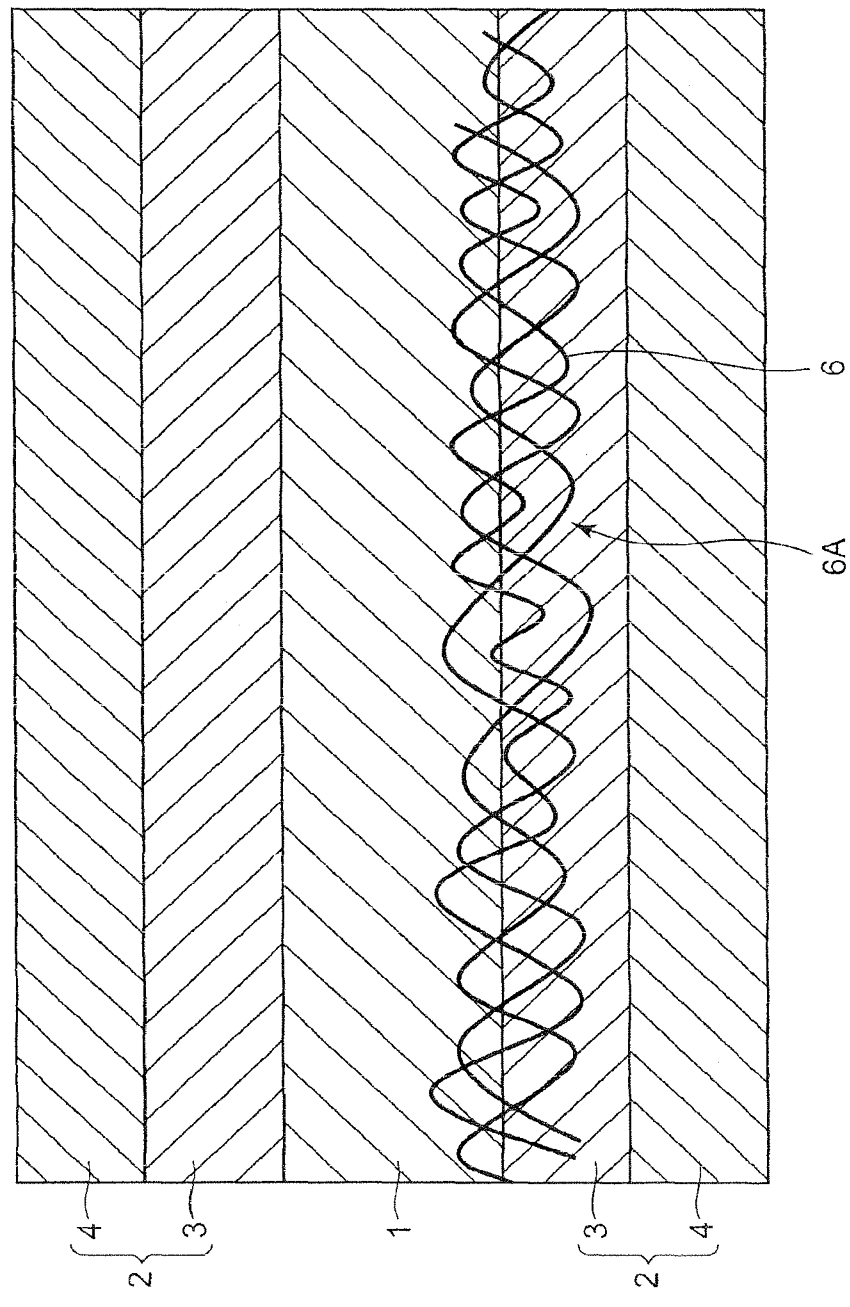
FIG. 8 is a schematic configuration diagram of a variation of the fuel cell according to the embodiment of the invention.
Figure 9:
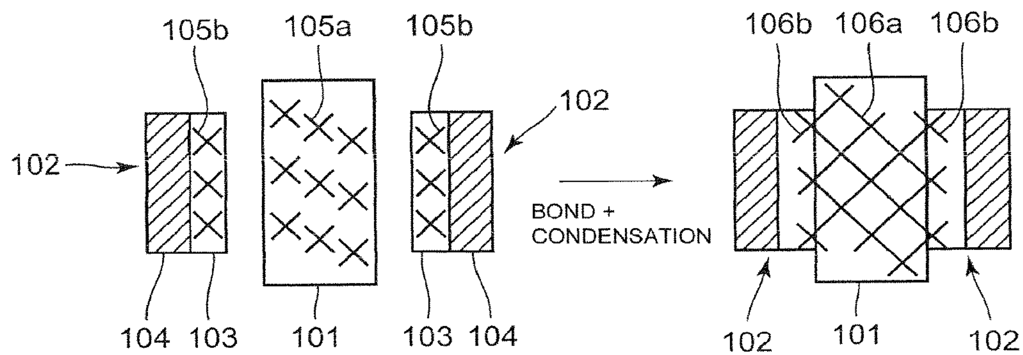
FIG. 9 is a schematic explanatory diagram of a manufacture method of a membrane-electrode assembly described in Patent Document 1.
Figure 10:
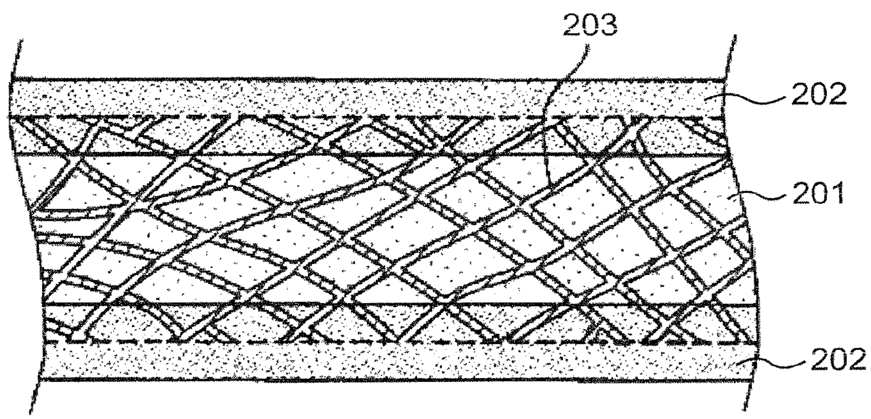
FIG. 10 is a schematic cross-sectional diagram of an outlined configuration of a membrane-electrode assembly described in Patent Document 2.

Though both of the pair of catalyst layers 3, 3 are configured to include the unwoven cloth 6A in this embodiment, the invention is not limited by this. The unwoven cloth 6A may be disposed to be included only in either one of the pair of catalyst layers 3, 3 as depicted in FIG. 8. In this case, preferably, the unwoven cloth 6A is disposed on the cathode electrode side. Thereby, occurrence of any cross leaking can further be suppressed.

Preferably, the region including the unwoven cloth 6A in the catalyst layer 3 is in a range from 10% or more to 90% or less of the thickness of the catalyst layer 3 from the interface between the electrolyte membrane 1 and the catalyst layer 3. When the range is lower than 10%, no contribution can be made for the propagation of the protons generated by the catalyst present in a region away from the electrolyte membrane 1 (on the side of the gas diffusion layer 4) and no sufficient proton conduction performance may be achievable. On the other hand, when the range is higher than 90%, the unwoven cloth 6A is disposed in the vicinity of the gas diffusion layer 4, and the delivery and the reception of electrons are blocked in the interface between the catalyst layer 3 and the gas diffusion layer 4. Therefore, the resistive loss may be increased.

Preferably, the diameter of each of the proton conductive fibers 6 (the average fiber diameter) is equal to or smaller than 1 μm. Setting the diameter of each of the proton conductive fibers 6 to be equal to or smaller than 1 μm enables formation of more proton conduction paths leading from the catalyst to the electrolyte membrane 1. Also, the setting of the diameter enables an increase of the contact area between the proton conductive fibers 6 and the catalyst, and this enables further improvement of the electric power generation performance of the fuel cell. When the diameter is larger than 1 μm, the fiber intervals of the proton conductive fibers 6 are each narrow and the gaps thereamong cannot sufficiently be filled with the catalyst. Therefore, no necessary electric power generation performance may be able to be secured.

Preferably, the diameter of each of the proton conductive fibers 6 (the average fiber diameter) is equal to or larger than 0.1 μm. When the diameter is smaller than 0.01 μm, the strength of the proton conductive fibers 6 cannot sufficiently be acquired. Therefore, the catalyst layer 3 may peel off from the electrolyte membrane 1.

Preferably, the unwoven cloth 6A is buried in the electrolyte membrane 1 at a depth two or more times as large as the diameter of each of the proton conductive fibers 6. Thereby, the proton conductive fibers 6 can be caused to more securely function as an anchor and the peeling off of the catalyst layer 3 from the electrolyte membrane 1 can be prevented.

Figure 4:
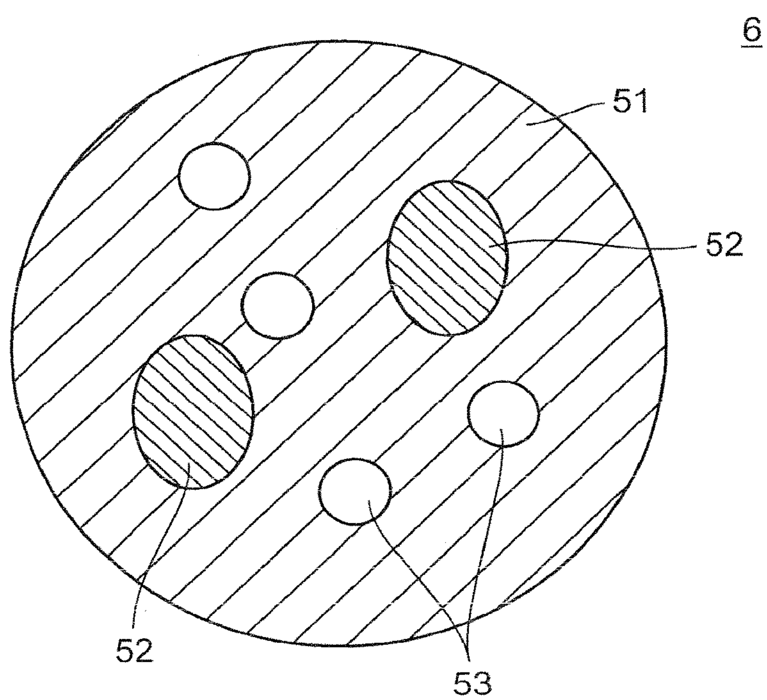
FIG. 4 is a schematic cross-sectional diagram of the structure of a proton conductive fiber.

The structure of the proton conductive fibers 6 will be described. FIG. 4 is a schematic cross-sectional diagram of the structure of the proton conductive fiber 6.

As depicted in FIG. 4, the proton conductive fibers 6 are each configured to have the fluorocarbon-based polymers 52 and air gaps 53 present in the perfluorosulphonic acid-based polymer 51. The weight ratios of the perfluorosulphonic acid-based polymer and the fluorocarbon-based polymer are, for example, 5:5.

In this embodiment, the proton conductive fibers 6 each include a mixed assembly of the perfluorosulphonic acid-based polymer 51 and the fluorocarbon-based polymer 52. The perfluorosulphonic acid-based polymer 51 has excellent compatibility for electrolyte and can improve the proton conduction performance. On the other hand, the fluorocarbon-based polymer 52 can function as a core material and can improve the mechanical strength. Therefore, configuring the proton conductive fibers 6 as above enables acquisition of excellent proton conduction performance and excellent mechanical strength, and also enables securing of long-term durability.

In this embodiment, the proton conductive fibers 6 each include the plural fibers of the fluorocarbon-based polymer 52 and the one piece of perfluorosulphonic acid-based polymer 51 having therein the plural fibers of the fluorocarbon-based polymer 52. Thereby, the outer surface of the proton conductive fiber 6 in contact with the catalyst layer 3 becomes the perfluorosulphonic acid-based polymer 51 and excellent proton conduction performance can be acquired, and the electric power generation performance of the fuel cell can further be improved.

In this embodiment, one or more air gap(s) 53 is/are present in each of the proton conductive fibers 6 and the proton conductive fibers 6 can each accumulate moisture therein. Thereby, the proton conduction performance in the proton conductive fibers 6 can be improved even when the humidity of the catalyst layer 3 is low, and the electric power generation property of the fuel cell can further be improved.

Preferably, the electrolyte membrane 1 includes a perfluorosulphonic acid-based polymer that is the same type of material as the perfluorosulphonic acid-based polymer included in the proton conductive fibers 6. In this case, the delivery and the reception of protons can be facilitated between the proton conductive fibers 6 and the electrolyte membrane 1, and the electric power generation performance of the fuel cell can further be improved.

Preferably, the catalyst layer 3 includes a perfluorosulphonic acid-based polymer that is the same type of material as the perfluorosulphonic acid-based polymer included in the proton conductive fibers 6. In this case, the delivery and the reception of protons can be facilitated between the proton conductive fibers 6 and the catalyst layer 3, and the electric power generation performance of the fuel cell can further be improved.

When the weight of the perfluorosulphonic acid-based polymer 51 is smaller than the weight of the fluorocarbon-based polymer 52, the proton conduction performance is degraded. Preferably, the weight of the perfluorosulphonic acid-based polymer 51 is 0.25 or more times as heavy as the weight of the fluorocarbon-based polymer 52.

On the other hand, when the weight of the perfluorosulphonic acid-based polymer 51 is heavier than the weight of the fluorocarbon-based polymer 52, the proton conduction performance is improved. In this case, however, the proton conductive fibers 6 absorb produced water produced during the electric power generation by the fuel cell and the moisture included in the fuel gas or the oxidizer gas to swell or contract. The catalyst layer 3 tends to peel off from the electrolyte membrane 1. Preferably, the weight of the perfluorosulphonic acid-based polymer 51 is four or less times as heavy as the weight of the fluorocarbon-based polymer 52.

An example of the manufacture method of the proton conductive fiber 6 will be described.

In this embodiment, the proton conductive fibers 6 are each formed by solving the perfluorosulphonic acid-based polymer 51 and the fluorocarbon-based polymer 52 in an organic solvent and forming the fibers using the solution and the electro-spinning method.

According to the method, the outer surface of each of the proton conductive fibers 6 can be formed by the perfluorosulphonic acid-based polymer 51. The formation of the outer surface of each of the proton conductive fibers 6 using the perfluorosulphonic acid-based polymer 51 enables advantageous disposition of the proton conductive fibers 6 in the interface between the electrolyte membrane 1 and the catalyst layer 3. According to the method, the structure can be realized that includes the perfluorosulphonic acid-based polymer 51 having therein the plural fibers of the fluorocarbon-based polymer 52. Further, the structure can be realized that includes the perfluorosulphonic acid-based polymer 51 having one or more air gap(s) 53 present therein.

For example, a polyvinylidene fluoride polymer (hereinafter, referred to as "PVDF") is usable as the material of the fluorocarbon-based polymer 52. PVDF has a feature that PVDF is easy to be formed as fibers using the electro-spinning method.

The material of the fluorocarbon-based polymer 52 only has to be a material having high durability against the electrolyte membrane 1 and the catalyst layer 3 during the electric power generation by the fuel cell 10. For example, a polyvinyl fluoride polymer (hereinafter, referred to as "PVF"), a copolymer including plural monomer units constituting a polymer selected from PVDF and PVF, or a mixture of these polymers may be used as the material of the fluorocarbon-based polymer 52.

Preferably, the molecular weight of the fluorocarbon-based polymer 52 is 150,000 to 550,000. When the molecular weight of the fluorocarbon-based polymer 52 is smaller than 150,000, no sufficient mechanical strength can be acquired. On the other hand, when the molecular weight of the fluorocarbon-based polymer 52 is larger than 550,000, the solubility is degraded and formation of the fibers using the polymer is difficult.

Figure 5A:
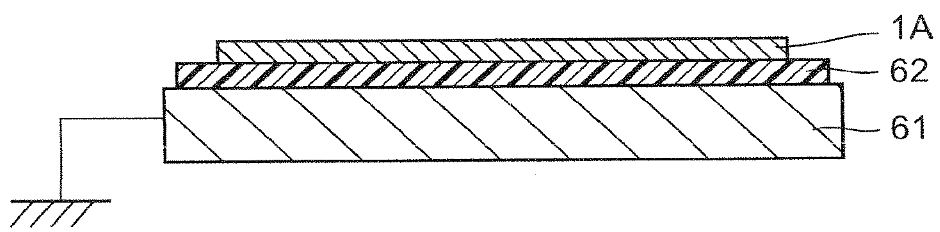
FIG. 5A is a schematic explanatory diagram of an example of a method of forming the proton conductive fiber in the vicinity of the interface between the electrolyte membrane and a catalyst layer.
Figure 5B:
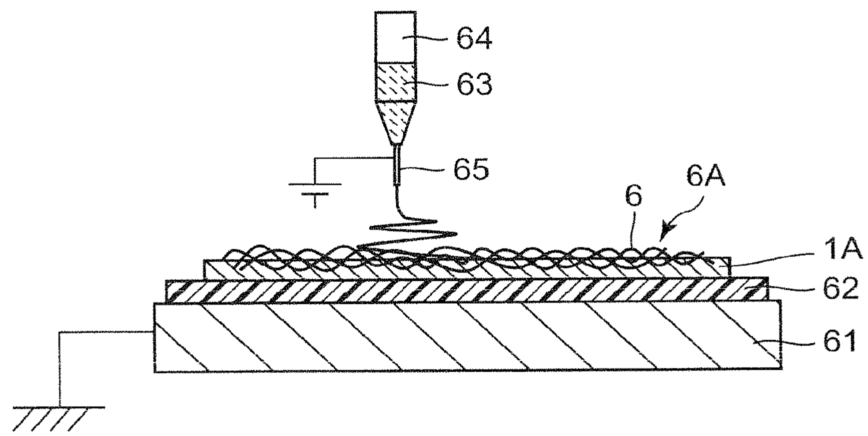
FIG. 5B is an explanatory diagram of a process step succeeding that of FIG. 5A.
Figure 5C:
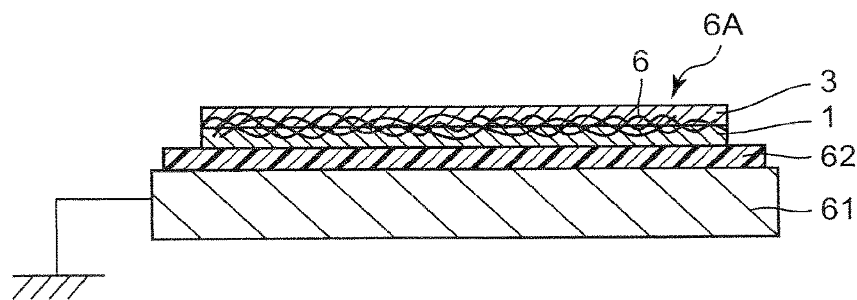
FIG. 5C is an explanatory diagram of a process step succeeding that of FIG. 5B.

An example will be described of a method of forming the unwoven cloth 6A including the proton conductive fibers 6 in the vicinity of the interface between the electrolyte membrane 1 and the catalyst layer 3. FIGS. 5A to 5C are schematic explanatory diagrams of the method.

As depicted in FIG. 5A, a PET base material 62 is first disposed on a collector 61 connected to the ground, and an electrolyte solution 1A including the materials of the electrolyte membrane 1 is applied onto the PET base material 62.

As depicted in FIG. 5B, the unwoven cloth 6A is formed on the surface of the undried electrolyte solution 1A. In this embodiment, the unwoven cloth 6A is formed using the electro-spinning method.

The electrolyte solution 1A is dried in a drying furnace (not depicted), and the electrolyte membrane 1 is formed that has a portion of the unwoven cloth 6A buried therein.

As depicted in FIG. 5C, the catalyst layer 3 is formed to cover the other portion of the unwoven cloth 6A (the exposed portion), on the surface of the electrolyte membrane 1.

According to the formation method, the portion of the unwoven cloth 6A can be buried in the electrolyte membrane 1 by forming the unwoven cloth 6A on the surface of the undried electrolyte solution 1A.

According to the formation method, the unwoven cloth 6A can be formed directly on the surface of the electrolyte solution 1A and the productivity can be improved because the unwoven cloth 6A is formed using the electro-spinning method.

The application of the electrolyte solution 1A onto the PET base material 62 can be executed using, for example, a slit die (not depicted) or a bar coater (not depicted). For example, "Aquivion (a registered trademark)" manufactured by Solvay Solexis Inc., is usable as the materials of the electrolyte.

For example, a solvent having water and isopropyl alcohol mixed therein at 5:5 for the solid content concentration to be 5 wt % is usable as the solvent of the electrolyte solution 1A. Instead of isopropyl alcohol, a material based on another alcohol may be used. The alcohol-based material to be used may be selected taking into consideration the time period for the electrolyte solution 1A to dry. The ratios of the water and the alcohol-based material may be adjusted corresponding to the time period for the electrolyte solution 1A to dry. For example, when the time period for the electrolyte solution 1A to dry is desired to be extended, the rate of water only has to be increased. When the time period for the electrolyte solution 1A to dry is desired to be extended compared to that of the case where a mixed solvent including water and an alcohol-based material is used as the solvent of the electrolyte solution 1A, a solvent having a boiling point higher than that of water only has to be used.

Preferably, 5% or more of the alcohol-based material is mixed in the solvent of the electrolyte solution 1A. When only water is used as the solvent of the electrolyte solution 1A, the contact angle against the proton conductive fiber 6 becomes large and the solvent bounces off the proton conductive fiber 6. Therefore, it is difficult to bury the unwoven cloth 6A including the proton conductive fibers 6 in the electrolyte solution 1A.

The thickness of the applied electrolyte solution 1A only has to be adjusted such that the membrane thickness of the electrolyte membrane 1 is about 30 μm when the solvent of the electrolyte solution 1A dries and the electrolyte membrane 1 is formed.

For example, the following operations only have to be executed to form the unwoven cloth 6A using the electro-spinning method.

A syringe 64 is filled with a mixed solution 63 formed by solving the perfluorosulphonic acid-based polymer 51 and the fluorocarbon-based polymer 52 in the organic solvent. Thereafter, a voltage is thereafter applied between a metal nozzle 65 attached to the tip of the syringe 64 and the collector 61. The applied voltage charges the mixed solution 63 and this causes the mixed solution 63 to be ejected toward the undried electrolyte solution 1A.

The mixed solution 63 electrostatically bursts between the ejection thereof from the metal nozzle 65 and arrival thereof in the undried electrolyte solution 1A. Thereby, the proton conductive fiber 6 having a small diameter (the average fiber diameter) is formed on the undried electrolyte membrane solution 1A. The metal nozzle 65 is moved relatively to the collector 61 such that the proton conductive fibers 6 are formed over substantially the overall undried electrolyte solution 1A. Thereby, the unwoven cloth 6A is formed that includes the proton conductive fibers 6.

The mixed solution 63 is formed by solving the perfluorosulphonic acid-based polymer 51 and the fluorocarbon-based polymer 52 in the organic solvent. For example, "Aquivion (a registered trademark)" manufactured by Solvay Solexis Inc., is usable as the perfluorosulphonic acid-based polymer 51. For example, dimethylacetamide (hereinafter, referred to as "DMAC") is usable as the organic solvent. The organic solvent only has to be a solvent that solves the perfluorosulphonic acid-based polymer 51 and the fluorocarbon-based polymer 52 that are the solutes. For example, dimethylsulphoxide, dimethylformamide, or acetone may be used as the organic solvent.

Preferably, the solid content concentration of the mixed solution 63 is 10 to 25 wt %. When the solid content concentration of the mixed solution 63 is lower than 10 wt %, no sufficient average fiber diameter can be acquired and the mechanical strength is degraded. Therefore, the electrolyte membrane 1 and the catalyst layer 3 may peel off from each other. On the other hand, when the solid content concentration of the mixed solution 63 is higher than 25 wt %, no sufficient electrostatic bursting may be able to be caused using the electro-spinning method and no fibers may be formed.

Preferably, the diameter of an ejection hole of the metal nozzle 65 for the mixed solution 63 is 0.18 mm to 0.42 mm. When the diameter is smaller than 0.18 mm, the amount of the ejected mixed solution 63 is small and the productivity of the proton conductive fibers 6 is degraded. On the other hand, when the diameter is larger than 0.42 mm, the amount of the ejected mixed solution 63 is excessively much. Therefore, no sufficient electrostatic bursting may be caused and no fiber may be formed.

For example, an air-pulse dispenser (not depicted) is usable for the ejection of the mixed solution 63. Preferably, the liquid feeding pressure of the dispenser is 1 kPa to 20 kPa. When the liquid feeding pressure of the dispenser is lower than 1 kPa, the amount of the ejected mixed solution 63 is small and the productivity of the proton conductive fibers 6 is degraded. On the other hand, when the liquid feeding pressure of the dispenser is higher than 20 kPa, the amount of the ejected mixed solution 63 is excessively much. Therefore, no sufficient electrostatic bursting may be caused and no fiber may be formed.

Preferably, the voltage applied between the metal nozzle 65 and the collector 61 is 1 kV to 20 kV. When the voltage is lower than 1 kV, no sufficient electrostatic bursting may be caused and no fiber may be formed. When the voltage is lower than 1 kV, the ejection velocity of the mixed solution 63 is low and the proton conductive fibers 6 cannot be buried up to a sufficient depth in the electrolyte membrane 1. On the other hand, when the voltage is higher than 20 kV, the ejection velocity of the mixed solution 63 is excessively high and the mixed solution 63 arrives at the electrolyte solution 1A before the electrostatic bursting occurs. Therefore, no proton conductive fibers 6 each having a proper thickness may be acquired.

The voltage applied between the metal nozzle 65 and the collector 61 is not limited to a positive voltage and may be a negative voltage. The polarity of the voltage only has to properly be selected corresponding to the material to be formed as the fibers.

Preferably, the distance between the metal nozzle 65 and the collector 61 is 90 mm to 250 mm. When the distance is shorter than 90 mm, the time period from the ejection of the mixed solution 63 from the metal nozzle 65 to the arrival thereof in the electrolyte solution 1A becomes short. Therefore, the mixed solution 63 arrives in the electrolyte solution 1A before the electrostatic bursting occurs. Therefore, no proton conductive fiber 6 may be acquired that has a proper thickness. On the other hand, when the distance is longer than 250 mm, the mixed solution 63 ejected from the metal nozzle 65 spreads out in a wide range due to the electrostatic bursting. Thereby, the proton conductive fibers 6 are formed outside the PET base material 62. Therefore, the material efficiency is degraded and the productivity of the proton conductive fibers 6 is degraded.

The degree of the electrostatic bursting differs depending on the viscosity and the amount of the mixed solution 63. For example, it can be considered that, in the case where the mixed solution 63 reaches the electrolyte solution 1A, when the solvent of the mixed solution 63 is not sufficiently dried and is in a wet state, the electrostatic bursting becomes insufficient. In this case, for example, reduction of the amount of the ejected mixed solution 63 enables occurrence of sufficient electrostatic bursting. When the amount of the ejected mixed solution 63 is not desired to be reduced to acquire high productivity, the sufficient electrostatic bursting can be caused by increasing the distance between the metal nozzle 65 and the collector 61 or reducing the voltage applied between the metal nozzle 65 and the collector 61.

A metal nozzle may be used that has plural nozzle holes disposed therein as the metal nozzle 65 to increase the amount of the ejected mixed solution 63. In this case, preferably, the intervals among the plural nozzle holes are each equal to or larger than 10 mm. When the intervals among the plural nozzle holes are each smaller than 10 mm, a charge retained by the mixed solution 63 ejected from a first nozzle hole and a charge retained by the mixed solution 63 ejected from a second nozzle hole adjacent to the first nozzle hole repel each other and no proper electrostatic bursting may be caused.

When the electrolyte solution 1A is dried in the drying furnace (not depicted), the time period to dry the electrolyte solution 1A is, for example, 10 min and the temperature to dry the electrolyte solution 1A is, for example, 80° C. The time period and the temperature to dry the electrolyte solution 1A in the drying furnace only have to properly be adjusted corresponding to the materials of the electrolyte membrane, the solvent of the electrolyte solution, and the concentration thereof.

Preferably, a thermal annealing process is applied to the electrolyte membrane 1 acquired by drying the electrolyte solution 1A. Thereby, the electrolyte can be crystallized and the durability of the electrolyte membrane 1 can be enhanced. When the temperature of the thermal annealing is low, the electrolyte may not sufficiently be crystallized and the durability of the electrolyte membrane 1 may be degraded. Preferably, the temperature of the thermal annealing is higher than the glass transition temperature of the material of the electrolyte by 10° C. or more. When the time period of the thermal annealing is short, the electrolyte may not sufficiently be crystallized and the durability of the electrolyte membrane 1 may be degraded. On the other hand, when the time period of the thermal annealing is long, the electrolyte may excessively be crystallized and the proton conduction performance of the electrolyte membrane 1 may be degraded. Preferably, the time period of the thermal annealing is equal to or longer than 20 min and equal to or shorter than two hr.

The catalyst layer 3 can be formed by spray-applying or die-applying the solution formed by dispersing the catalyst, the catalyst carrier, and the electrolyte in a solvent such as water or ethanol, to the surface of the electrolyte membrane 1. The formation method of the catalyst layer 3 is not especially limited, and only has to be a method capable of filling the gaps among the proton conductive fibers 6 with the catalyst.

The method of forming the unwoven cloth 6A in the vicinity of the interface between the electrolyte membrane 1 and the catalyst layer 3 is not limited to the method depicted in FIGS. 5A to 5C, and a method depicted in FIGS. 6A to 6E may be used.

Figure 6A:
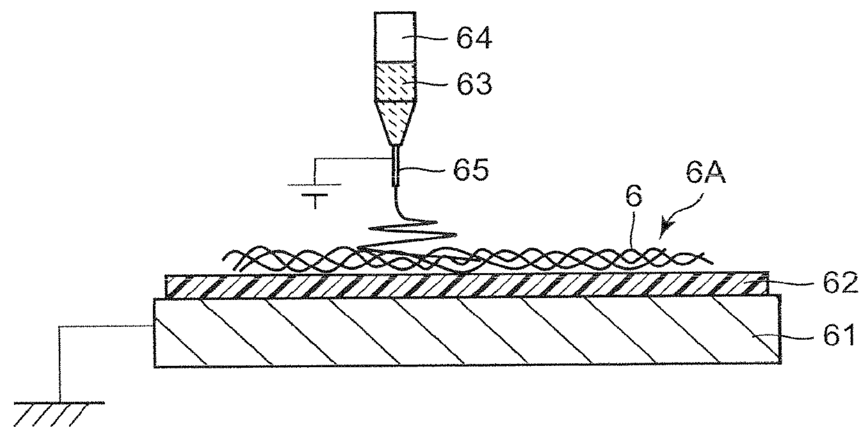
FIG. 6A is a schematic explanatory diagram of another example of the method of forming the proton conductive fiber in the vicinity of the interface between the electrolyte membrane and the catalyst layer.

As depicted in FIG. 6A, the PET base material 62 is disposed on the collector 61 connected to the ground, and the unwoven cloth 6A is formed on the PET base material 62 using the electro-spinning method.

As depicted in FIG. 6B, the unwoven cloth 6A is peeled off from the PET base material 62. Preferably, a process of improving the demold property is applied to the surface of the PET base material 62 to facilitate the peeling off of the unwoven cloth 6A.

As depicted in FIG. 6C, the electrolyte solution 1A is applied onto the PET base material 62.

As depicted in FIG. 6D, the unwoven cloth 6A is disposed on the electrolyte solution 1A before the electrolyte solution 1A dries. Thereby, a portion of the unwoven cloth 6A is buried in the electrolyte solution 1A.

The electrolyte solution 1A is dried in the drying furnace (not depicted). Thereby, the electrolyte membrane 1 is formed having the portion of the unwoven cloth 6A buried therein.

As depicted in FIG. 6E, the catalyst layer 3 is formed on the electrolyte membrane 1.

Thereby, the structure can be acquired that has the unwoven cloth 6A formed in the vicinity of the interface between the electrolyte membrane 1 and the catalyst layer 3.

An example of a method of forming the unwoven cloth 6A in the vicinity of the interface between both of the surfaces of the electrolyte membrane 1 and the catalyst layers 3, 3. FIGS. 7A to 7D are schematic explanatory diagrams of the method.

As depicted in FIG. 7A, two electrolyte membranes 1*a* are prepared that each have the unwoven cloth 6A formed on its one surface. The electrolyte membranes 1*a* can each be formed according to the same method as the method described with reference to FIG. 5B or 6D.

Figure 7B:
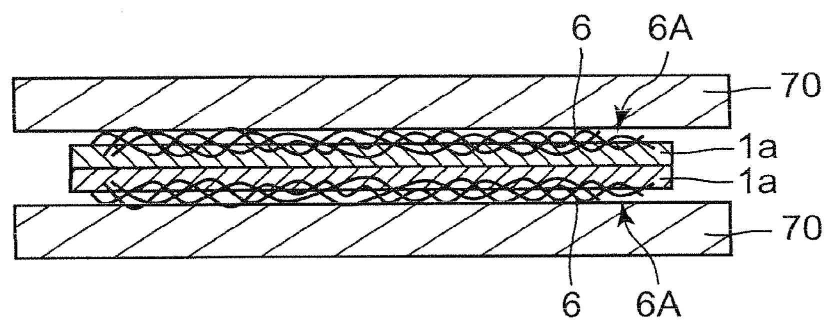
FIG. 7B is an explanatory diagram of a process step succeeding that of FIG. 7A.
Figure 7C:
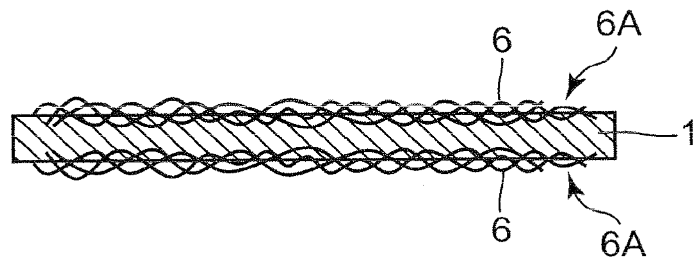
FIG. 7C is an explanatory diagram of a process step succeeding that of FIG. 7B.

As depicted in FIG. 7B, the other surfaces of the two electrolyte membranes 1*a*, 1*a* (the surfaces having no unwoven cloth 6A formed thereon) are brought into contact with each other, and the two electrolyte membranes 1*a*, 1*a* are sandwiched by flat presses 70. Thereafter, the flat presses 70 apply heat and a pressure to the two electrolyte membranes 1*a*, 1*a*. Thereby, as depicted in FIG. 7C, the two electrolyte membranes 1*a*, 1*a* are integrated with each other (cohered to each other) to form the one electrolyte membrane 1.

Figure 7D:
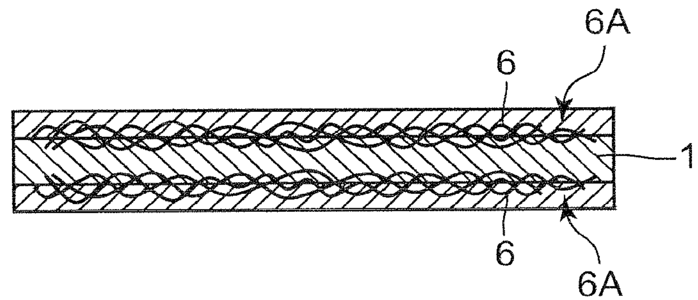
FIG. 7D is an explanatory diagram of a process step succeeding that of FIG. 7C.

As depicted in FIG. 7D, the catalyst layers 3, 3 are formed to cover the pieces of unwoven cloth 6A, 6A on both of the surfaces of the electrolyte membrane 1.

When the heating temperature by the flat presses 70 is low, the two electrolyte membranes 1*a*, 1*a* may not be integrated with each other and may be peeled off from each other. Therefore, the heating temperature by the flat presses 70 is preferably higher than the glass transition temperature of the material of the electrolyte by 10° C. or more.

Preferably, the heating and the pressuring by the flat presses 70 are executed in a reduced pressure environment. Thereby, the integration can be prevented of the two electrolyte membranes 1*a*, 1*a* having air mixed between the two.

The invention is not limited to the embodiment and can be implemented in other various aspects. For example, though the two electrolyte membranes 1*a*, 1*a* are integrated with each other to form the one electrolyte membrane 1, and the catalyst layers 3, 3 are thereafter formed on both of the surfaces of the electrolyte membrane 1 in the above, the invention is not limited by this. For example, the catalyst layer 3 may be formed in advance to cover the unwoven cloth 6A on the one surface of each electrolyte membrane 1*a* and the heating and the pressuring may thereafter be executed by the flat presses 70. In this case, the heat and the pressure are also applied to the catalyst layer 3 and the adhesion strength can be improved between the catalyst layer 3 and the electrolyte membrane 1.

Although the invention has been fully described in connection with the preferred embodiment thereof with reference to the accompanying drawings, it is to be noted that various changes and modifications thereto are apparent to those skilled in the art. Such changes and modifications are to be understood as included within the scope of the invention as defined by the appended claims unless they depart therefrom.

The entire disclosure of Japanese Patent Application No. 2013-117967 filed on Jun. 4, 2013 including specification, drawings, and claims are incorporated herein by reference in its entirely.

INDUSTRIAL APPLICABILITY

According to the membrane-electrode assembly and the manufacture method thereof of the invention, the electric power generation performance can further be improved. Therefore, the assembly and the method are useful especially for a solid polymer fuel cell used in a household use cogeneration system, a fuel cell car, a base station for mobile communication, etc.

EXPLANATIONS OF REFERENCE OR NUMERALS

1 electrolyte membrane
1A electrolyte solution
2 electrode layer
3 catalyst layer
4 gas diffusion layer
5*a*, 5*b* separator
6 proton conductive fiber
6A unwoven cloth
10 fuel cell
11 membrane-electrode assembly
12 electrode-membrane-frame assembly
20 single cell
21 collector plate
21*a* terminal unit
22 insulating plate
23 end plate
30 stack
31 fuel treating device
32 anode humidifier
33 cathode humidifier
34, 35, 36 pump
37 heat exchanger
38 hot water storage tank
40 operation control device
41 electric power output unit
51 perfluorosulphonic acid-based polymer
52 fluorocarbon-based polymer
53 air gap
61 collector
62 PET base material
63 mixed solution
64 syringe
65 metal nozzle
70 flat press

The invention claimed is:

1. A membrane-electrode assembly comprising:
an electrolyte membrane;
a pair of catalyst layers facing each other sandwiching the electrolyte membrane; and
a pair of gas diffusion layers facing each other sandwiching the electrolyte membrane and the pair of catalyst layers, wherein
at least one of the pair of catalyst layers includes unwoven cloth comprising proton conductive fibers each having proton conduction performance, and
an entire surface of the electrolyte membrane side of the unwoven cloth is substantially buried in the electrolyte membrane adjacent to the catalyst layer including the unwoven cloth at a depth two or more times as large as a diameter of the proton conductive fiber and less than a half of a thickness of the electrolyte membrane.

2. The membrane-electrode assembly according to claim 1, wherein
the unwoven cloth is included in each of both of the pair of catalyst layers, and
the unwoven cloth included in one of the pair of catalyst layers and the unwoven cloth included in a other of the pair of catalyst layers are disposed away from each other.

3. The membrane-electrode assembly according to claim 1, wherein
the unwoven cloth is disposed only on a cathode electrode side.

4. The membrane-electrode assembly according to claim 1, wherein
a region including the unwoven cloth is in a range from 10% or higher to 90% or lower of a thickness of the catalyst layer from an interface between the electrolyte membrane and the catalyst layer.

5. The membrane-electrode assembly according to claim 1, wherein the proton conductive fiber comprises a mixture of a perfluorosulphonic acid-based polymer and a fluorocarbon-based polymer.

6. The membrane-electrode assembly according to claim 5, wherein a weight of the perfluorosulphonic acid-based polymer is 0.25 or greater times and four or smaller times as heavy as a weight of the fluorocarbon-based polymer.

7. The membrane-electrode assembly according to claim 5, wherein the electrolyte membrane comprises a perfluorosulphonic acid-based polymer that is a same type of material as the perfluorosulphonic acid-based polymer included in the proton conductive fiber.

8. The membrane-electrode assembly according to claim 5, wherein the catalyst layer comprises a perfluorosulphonic acid-based polymer that is a same type of material as the perfluorosulphonic acid-based polymer included in the proton conductive fiber.

9. The membrane-electrode assembly according to claim 1, wherein the proton conductive fiber comprises plural fluorocarbon-based polymer fibers, and one perfluorosulphonic acid-based polymer piece having therein the plural fluorocarbon-based polymer fibers.

10. The membrane-electrode assembly according to claim 1, wherein the structure has one or more air gap(s) present therein.

11. A solid polymer fuel cell comprising the membrane-electrode assembly according to claim 1.

* * * * *